United States Patent
McHugh et al.

(10) Patent No.: US 9,037,422 B2
(45) Date of Patent: May 19, 2015

(54) LEAK DETECTION IN FLUID CONDUCTING CONDUIT

(75) Inventors: Robert Terrence McHugh, San Diego, CA (US); Errol F. Jacob, Cleveland Heights, OH (US); Daniel Matthew Wilbers, San Marcos, CA (US)

(73) Assignee: Invensys Systems, Inc., Foxboro, MA (US)

( * ) Notice: Subject to any disclaimer, the term of this patent is extended or adjusted under 35 U.S.C. 154(b) by 466 days.

(21) Appl. No.: 13/584,503

(22) Filed: Aug. 13, 2012

(65) Prior Publication Data

US 2014/0046605 A1 Feb. 13, 2014

(51) Int. Cl.
*G01M 3/28* (2006.01)
*G01M 3/32* (2006.01)

(52) U.S. Cl.
CPC .......... *G01M 3/2815* (2013.01); *G01M 3/3263* (2013.01); *G01M 3/3272* (2013.01); *G01M 3/3254* (2013.01)

(58) Field of Classification Search
CPC .......... G01M 3/2807; G01M 3/2815; G01M 3/3254; G01M 3/3263; G01M 3/3272
USPC .......................................................... 702/51
See application file for complete search history.

(56) References Cited

U.S. PATENT DOCUMENTS

| | | | | |
|---|---|---|---|---|
| 5,355,324 | A * | 10/1994 | Zhang .............................. | 702/45 |
| 6,526,358 | B1 * | 2/2003 | Mathews et al. ................ | 702/51 |
| 7,418,354 | B1 * | 8/2008 | Greenlee et al. ................ | 702/51 |
| 7,734,431 | B2 * | 6/2010 | Nitschke et al. ................ | 702/51 |
| 2007/0157706 | A1 * | 7/2007 | Yanagi et al. ................... | 73/49.2 |
| 2012/0324985 | A1 * | 12/2012 | Gu et al. ......................... | 73/40.5 R |
| 2013/0174649 | A1 * | 7/2013 | Hains et al. ................ | 73/40.5 R |

* cited by examiner

*Primary Examiner* — John Breene
*Assistant Examiner* — Lynda Dinh
(74) *Attorney, Agent, or Firm* — Thomas J. Roth, Esq.

(57) ABSTRACT

A method for detecting a leak in a fluid conducting conduit is disclosed. Inlet and outlet flowrates are measured for calculating a time derivative of average temperature of the fluid flowing in the fluid conducting conduit. A predicted difference in flowrate between a flowrate of fluid in the fluid conducting conduit adjacent the inlet and a flowrate of fluid in the fluid conducting conduit adjacent the outlet is calculated based on the calculated time derivative of the average temperature of the fluid flowing in the fluid conducting conduit. The predicted difference in flowrate is compared to a difference between the measured inlet flowrate and the measured outlet flowrate to determine whether a leak exists in the fluid conducting conduit.

19 Claims, 11 Drawing Sheets

LEAK DETECTION IN FLUID CONDUCTING CONDUIT

FIELD OF THE DISCLOSURE

Aspects of the present invention generally relate to a system and method for detecting a leak in a fluid conducting conduit.

BACKGROUND

It is common practice in the utility industry to locate transmission line conductors underground, particularly within urban areas. Typically, such electrical conductors are enclosed within an insulating or "cooling" pipe. The pipe carries a dielectric fluid for cooling and insulating the electrical conductors within the pipe. The dielectric fluid, which is often toxic or otherwise environmentally hazardous, is provided under pressure and may be static or circulate throughout "feeder" networks of the cooling pipes. Sensors are often placed throughout the feeder network to detect the pressure, flow, and level of the dielectric fluid, ground ambient temperature, and current loading of the electrical conductors.

Leaks of the hazardous dielectric fluid can occur within the feeder networks due to corrosion of the cooling pipes, valve leaks, or faulty operation. In order to minimize environmental degradation, it is desirable that actual or imminent leaks of such fluid be quickly identified and the feeder network repaired. Although the sensors throughout the feeder network may potentially be utilized in detecting such leaks, it is often relatively difficult to distinguish between sensed conditions indicative of leakage and other operational effects.

SUMMARY

In one aspect, a method for detecting a leak in a fluid conducting conduit generally comprises measuring an inlet flowrate of fluid flowing in the fluid conducting conduit using a first flowrate sensor. The first flowrate sensor is positioned adjacent an inlet of the fluid conducting conduit. An outlet flowrate of fluid flowing in the fluid conducting conduit is measured using a second flowrate sensor. The second flowrate sensor is positioned adjacent an outlet of the fluid conducting conduit. A time derivative of average temperature of the fluid flowing in the fluid conducting conduit is calculated based on the measured inlet flowrate and the measured outlet flowrate. A predicted difference in flowrate between a flowrate of fluid in the fluid conducting conduit adjacent the inlet and a flowrate of fluid in the fluid conducting conduit adjacent the outlet is calculated based on the calculated time derivative of the average temperature of the fluid flowing in the fluid conducting conduit. The predicted difference in flowrate is compared to a difference between the measured inlet flowrate and the measured outlet flowrate to determine whether a leak exists in the fluid conducting conduit.

In another aspect, a computer-implemented leak detection system for use in detecting a leak in a fluid conducting conduit generally comprises a first flowrate sensor positioned adjacent an inlet of the fluid conducting conduit for measuring an inlet flowrate of fluid. A second flowrate sensor is positioned adjacent an outlet of the fluid conducting conduit for measuring an outlet flowrate of fluid. A processor and a memory is provided. The processor is configured to: receive data, from the respective first and second flowrate sensors, relating to the measured inlet flowrate of fluid and the measured outlet flowrate of fluid; calculate a time derivative of average temperature of fluid based on the measured inlet flowrate and the measured outlet flowrate; calculate a predicted difference in flowrate between a flowrate of fluid in the fluid conducting conduit adjacent the inlet and a flowrate of fluid in the fluid conducting conduit adjacent the outlet based on the calculated time derivative of the average temperature of the fluid flowing in the fluid conducting conduit; and determine whether a leak exists in the fluid conducting conduit based on a comparison between the predicted difference in flowrate and a difference between the measured inlet flowrate and the measured outlet flowrate.

In yet another aspect, a non-transitory, computer-readable medium containing computer-readable instructions for use in detecting a leak in a fluid conducting conduit are executable by a processor for performing the steps of: receiving data, from a first flowrate sensor, relating to a measured inlet flowrate of fluid in the fluid conducting conduit; receiving data, from a second flowrate sensor, relating to a measured outlet flowrate of fluid in the fluid conducting conduit; calculating a time derivative of average temperature of fluid based on the measured inlet flowrate and the measured outlet flowrate; calculating a predicted difference in flowrate between a flowrate of fluid in the fluid conducting conduit adjacent the inlet and a flowrate of fluid in the fluid conducting conduit adjacent the outlet based on the calculated time derivative of the average temperature of the fluid flowing in the fluid conducting conduit; and determining whether a leak exists in the fluid conducting conduit based on a comparison between the predicted difference in flowrate and a difference between the measured inlet flowrate and the measured outlet flowrate.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
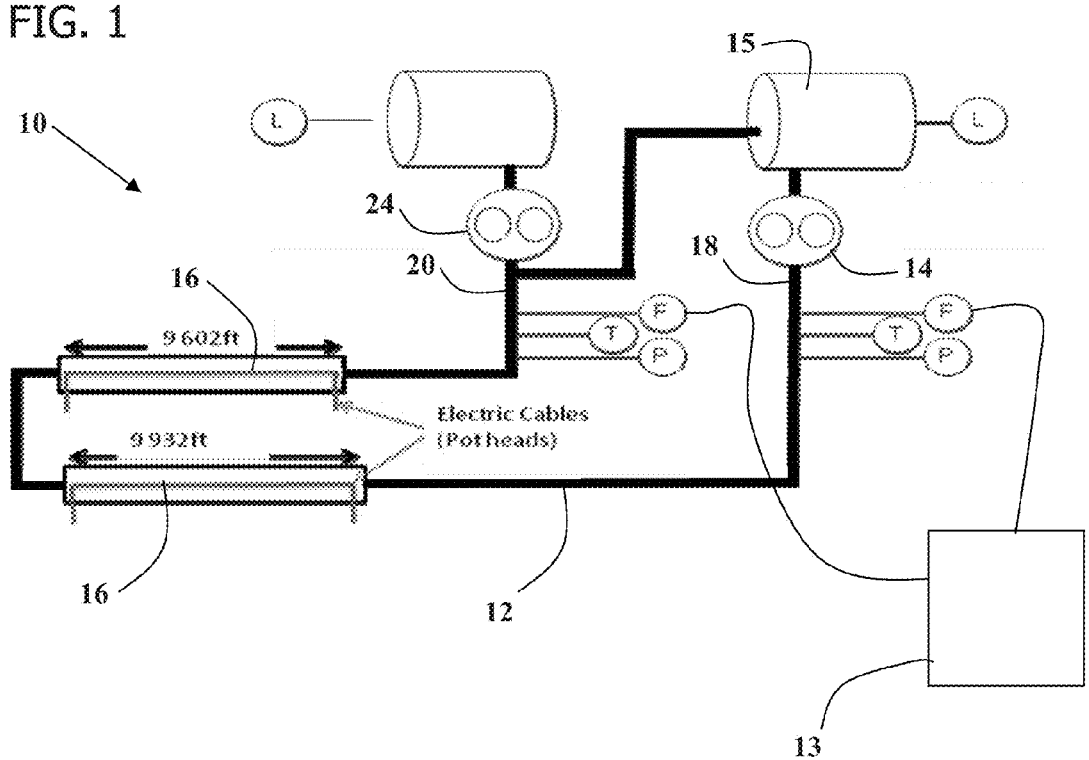
FIG. 1 is a schematic of one embodiment of a conduit system and a leak detection system in communication with the conduit system.

Referring now to the drawings, FIG. 1 is a schematic comprising: an exemplary conduit system, generally indicated at 10, including a fluid conducting conduit 12; and one embodiment of a leak detection system 13 for detecting whether a leak is present in the fluid conducting conduit. In one embodiment, the exemplary conduit system 10 is a feeder network for underground transmission line conductors. The conduit system 10 includes a pump 14 for delivering a pressurized fluid (e.g., a dielectric fluid) from a reservoir 15 through the fluid conducting conduit 12 (i.e., a main feeder line). At least one electrical transmission line conductor 16 (e.g., a cable) run through at least a portion of the main feeder line 12. The dielectric fluid flowing through the fluid conducting conduit 12 is in thermal contact with the transmission line conductor 16 so that heat from the transmission line conductor is transferred to the dielectric fluid to cool the transmission line conductor.

The fluid conducting conduit 12 includes an inlet 18 upstream of the transmission line conductor 16 (generally adjacent an outlet of the pump 14) for receiving the dielectric fluid from the pump. The conduit 12 also includes an outlet 20 disposed downstream of the transmission line conductor. An inlet flowrate sensor F1, an inlet temperature sensor T1, and an inlet pressure sensor P1 are disposed adjacent the inlet 18 of the fluid conducting conduit 12 for measuring the respective parameters of the fluid in the fluid conducting conduit at the inlet thereof. Similarly, an outlet flowrate sensor F2, an outlet temperature sensor T2, and an outlet pressure sensor P2 are disposed adjacent the outlet 20 of fluid conducting conduit 12 for measuring the respective parameters of the fluid in the fluid conducting conduit at the outlet thereof. As explained below, one embodiment of the leak detection system 13 requires inputs from only the inlet flowrate sensor F1 and the outlet flowrate sensor F2, and therefore, it is understood that the other sensors may not be provided without departing from the scope of the present invention. The conduit system 10 (i.e., the feeder network) also includes a pump 24 adjacent the outlet 20 of the fluid conduit 12. Pump 24 is operated when pump 14 has failed or is unavailable. When pump 24 operates, the fluid flows in the reverse direction of the normal operation described above, i.e. when pump 24 operates the fluid flows from the outlet 20 to the inlet 18.

Figure 2:
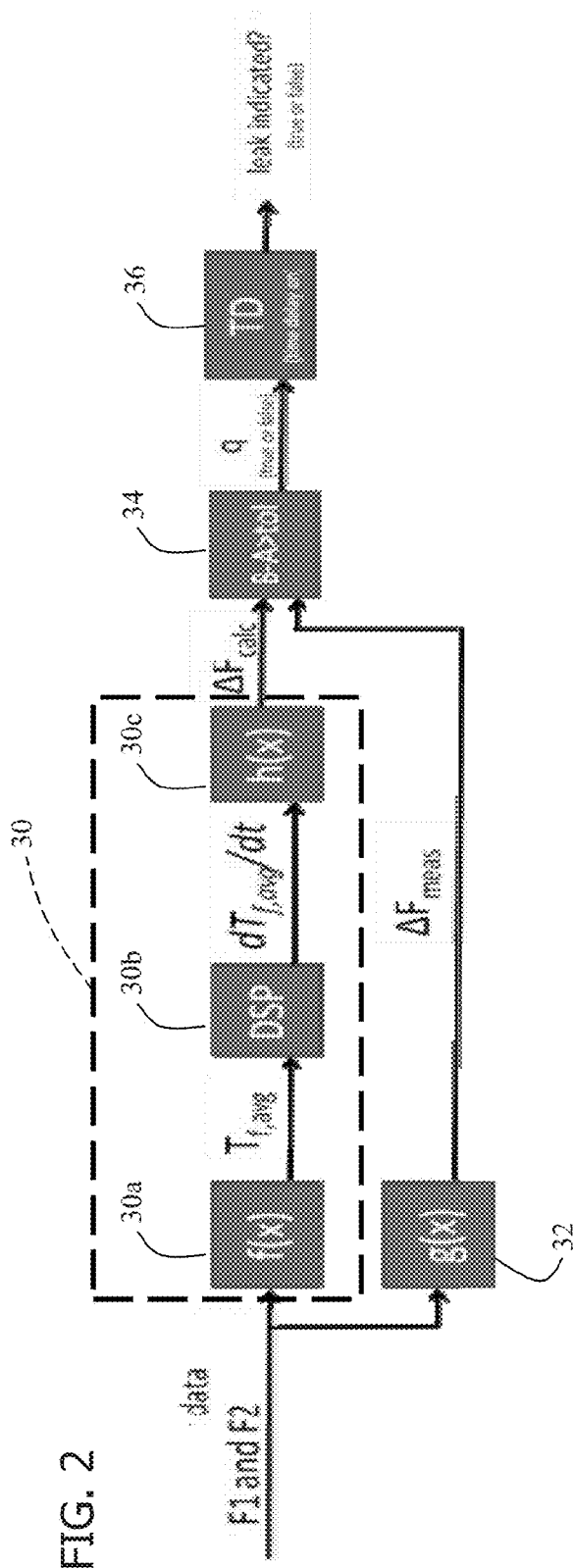
FIG. 2 is an exemplary work flow diagram of the leak detection system of FIG. 1.

Referring to FIGS. 1 and 2, the leak detection system 13 is in communication (e.g., wired or wireless) with the inlet and outlet flowrate sensors F1, F2, respectively, for receiving data indicating the flowrate of the fluid at the respective inlet 18 and outlet 20 of the fluid conducting conduit 12. In general, the leak detection system 13 uses the respective data from the flowrate sensors F1, F2 to determine whether there is a leak present in the fluid conducting conduit 12. A work flow diagram embodying an exemplary implementation of the leak detection process performed by the leak detection system 13 is provided in FIG. 2. The leak detection system 13 includes software (e.g., programmed set of instructions or algorithms stored on a tangible computer-readable medium) executed by a processor of the leak detection system 13 to perform process steps to determine whether there is a leak present in the fluid conducting conduit 12.

In the embodiment illustrated in FIG. 2, the leak detection system 13 processes the flowrate data from the inlet and outlet flowrate sensors F1, F2 at process step 30 to generate a predicted flowrate difference ($\Delta F_{pred}$), which represents the predicted difference in flowrate at the inlet 18 and outlet 20 of the fluid conducting conduit 12. The leak detection system 13 also processes the same flowrate data from the inlet and outlet flowrate sensors F1, F2 at process step 32 to generate a measured flowrate difference ($\Delta F_{meas}$). In this embodiment, $\Delta F_{meas}$ represents the measured difference in flowrate at the inlet 18 and outlet 20 of the fluid conducting conduit 12. The leak detection system 13 compares the predicted flowrate difference ($\Delta F_{pred}$) and the measured flowrate difference ($\Delta F_{meas}$) at process step 34 to determine if the difference (Q) between the predicted flowrate difference ($\Delta F_{pred}$) and the measured flowrate difference ($\Delta F_{meas}$) is greater than a threshold value (X). If the difference (Q) between the predicted flowrate difference ($\Delta F_{pred}$) and the measured flowrate difference ($\Delta F_{meas}$) is greater than the threshold value (X), then at step 36, the leak detection system 13 determines whether the difference (Q) between the predicted flowrate difference and the measured flowrate difference remains greater than the threshold value (X) for a predefined time period (T). If the difference (Q) between the predicted flowrate difference and the measured flowrate difference ($\Delta F_{meas}$) remains greater than the threshold value (X) for the predefined time period (T), then a leak is determined. The leak detection system 13 may sound an alarm or otherwise communicate that a leak was detected.

In general, calculating the predicted flowrate difference ($\Delta F_{pred}$) at process step 30 is predicated on the use of the continuity equation from fluid mechanics and assumptions that are made based on the conduit system 10. The continuity equation, from fluid mechanics (equation (1), below), relates the change in density of a fluid to the divergence of the mass flux.

$$\frac{d\rho}{dt} = \nabla \cdot (\rho v) \tag{1}$$

It is assumed that only the axial derivatives in the fluid conducting conduit 12 are significant. It is also assumed that the density ($\rho$) of the fluid in the fluid conducting conduit 12 is a function only of temperature (T) of the fluid. Using these two assumptions, the following equation (2) is derived from equation (1):

$$\frac{d\rho}{dt}\frac{dT}{dt} = v\frac{d\rho}{dT}\frac{dT}{dx} + \rho\frac{dv}{dx} \tag{2}$$

Equation (2) can be rearranged so that $$\rho\frac{dv}{dx}$$

is on the left hand side. Integrating this rearranged equation over the length (L) of the fluid conducting conduit 12 produces the following equation (3):

$$\int_{x=0}^{x=L} \rho\frac{dv}{dx}dx = \int_{x=0}^{x=L} \left(-\frac{d\rho}{dt}\frac{dT}{dt} + v\frac{d\rho}{dT}\frac{dT}{dx}\right)dx \tag{3}$$

The integrals in equation 3 can be approximated by assuming uniform heating (or cooling) of the fluid over the length of the conduit, such that the fluid density, fluid temperature, and their derivatives can be replaced by the respective average value. Applying this assumption to the integrals in equation 3 and using the technique of integration by parts we arrive at equation 4, where the over bar indicates an average value over the length of the conduit.

$$\overline{\rho}(v_{x=L} - v_{x=0}) = -L\overline{\frac{d\rho}{dT}}\overline{\frac{dT}{dt}} - \overline{\frac{d\rho}{dT}}(v_{(x=L)}(T_{x=L} - \overline{T}) - v_{(x=0)}(T_{(x=0)} - \overline{T})) \quad (4)$$

Multiplying both sides of equation (4) by the area (A) in the fluid conducting conduit 12 available for fluid flow, and noting the flowrate, F, is the product of velocity multiplied by area, A, yields the following equation (5):

$$\overline{\rho}(F_{x=L} - F_{x=0}) = \quad (5)$$
$$-AL\overline{\frac{d\rho}{dT}}\overline{\frac{dT}{dt}} - \overline{\frac{d\rho}{dT}}(F_{(x=L)}(T_{x=L} - \overline{T}) - F_{(x=0)}(T_{(x=0)} - \overline{T}))$$

The right hand side of equation (5) includes two terms: the first term having a time derivative of the average temperature as a variable, and a second term representing the flowrate of the fluid entering and leaving the fluid conducting conduit 12. For a typical slow circulation operation, such as a feeder network for underground transmission line conductors, the first term in equation (5), which includes the average temperature derivative as the variable, is the dominant term. Slow circulation operation describes an operating condition when the pump is continuously operating, providing a constant fluid flowrate through the feeder system. Slow circulation operation is characterized by fluid velocities which are high enough to protect the feeder system from accumulating heat at "hot spots," but slow enough that the primary heat rejection method is radial conduction from the copper wire though the fluid to the surrounding ground. Accordingly, the predicted difference in flowrate ($\Delta F_{pred}$) at the inlet 18 and outlet 20 of the fluid conducting conduit 12 may be mainly dependent on the time derivative of the average temperature. As explained below, in one example, only the first term in equation (5) is used to estimate or predict the difference in flowrate ($\Delta F_{pred}$) using the following equation (6), derived from equation (5):

$$\overline{\rho}(F_{x=L} - F_{x=0}) = -AL\overline{\frac{d\rho}{dT}}\overline{\frac{dT}{dt}} \quad (6)$$

In another example set forth below herein, both the first and second terms in equation (5) (i.e., the entirety of equation (5)) can be used to calculate the predicted difference in flowrate at the inlet 18 and outlet 20 of the fluid conducting conduit 12. The analysis of the second term can be carried out with energy balance or heat transfer models, as described in U.S. Pat. No. 7,418,354, the entirety of which is incorporated by reference herein.

In order to use equation (6) or equation (5) to calculate the predicted flowrate difference ($\Delta F_{pred}$), process step 30 comprises three sub-steps (i.e., sub-steps 30a, 30b, 30c). In general, at first sub-step 30a, the leak detection system 13 calculates an average temperature ($T_{f,avg}$) of the fluid in the fluid conducting conduit 12 at instantaneous time (t) based on the volumetric flowrate data from the inlet and outlet flowrate sensors F1, F2. At the second substep 30b, the leak detection system 13 calculates the time derivative of the average temperature ($dT_{f,avg}/dt$) instantaneous time (t) based on the average temperature ($T_{f,avg}$) calculated at sub-step 30a. The leak detection system 13, at sub-step 30c, then uses the calculated time derivative of the average temperature ($dT_{f,avg}/dt$) to calculate the predicted flowrate difference ($\Delta F_{pred}$). Each of these sub-steps 30a, 30b, 30c are explained in more detail hereinafter.

As set forth above, at the first sub-step 30a, the leak detection system 13 calculates an average temperature ($T_{f,avg}$) of the fluid in the fluid conducting conduit 12 at instantaneous time (t) based on the volumetric flowrate data from the inlet and outlet flowrate sensors F1, F2. The volumetric flowrate data can be used to calculate the average temperature ($T_{f,avg}$) of the fluid in the fluid conducting conduit 12 because there are no moving valves in the fluid conducting conduit 12 during normal operation of the illustrated conduit system 10 (i.e., the feeder network). Thus, any change in volumetric flowrate corresponds to a change in fluid properties, which are primarily determined by the fluid temperature (T). The data from the flowrate sensors F1, F2 are processed by the leak detection system 13 at a predefined time interval (or sampling rate). Thus, at step 30a the leak detection system 13 outputs a time series of average fluid temperatures (i.e., $\{t_1, T_{f1}\}, \{t_2, T_{f2}\}, \{t_3, T_{f3}\} \ldots \{t_n, T_{fn}\}$).

Figure 3:
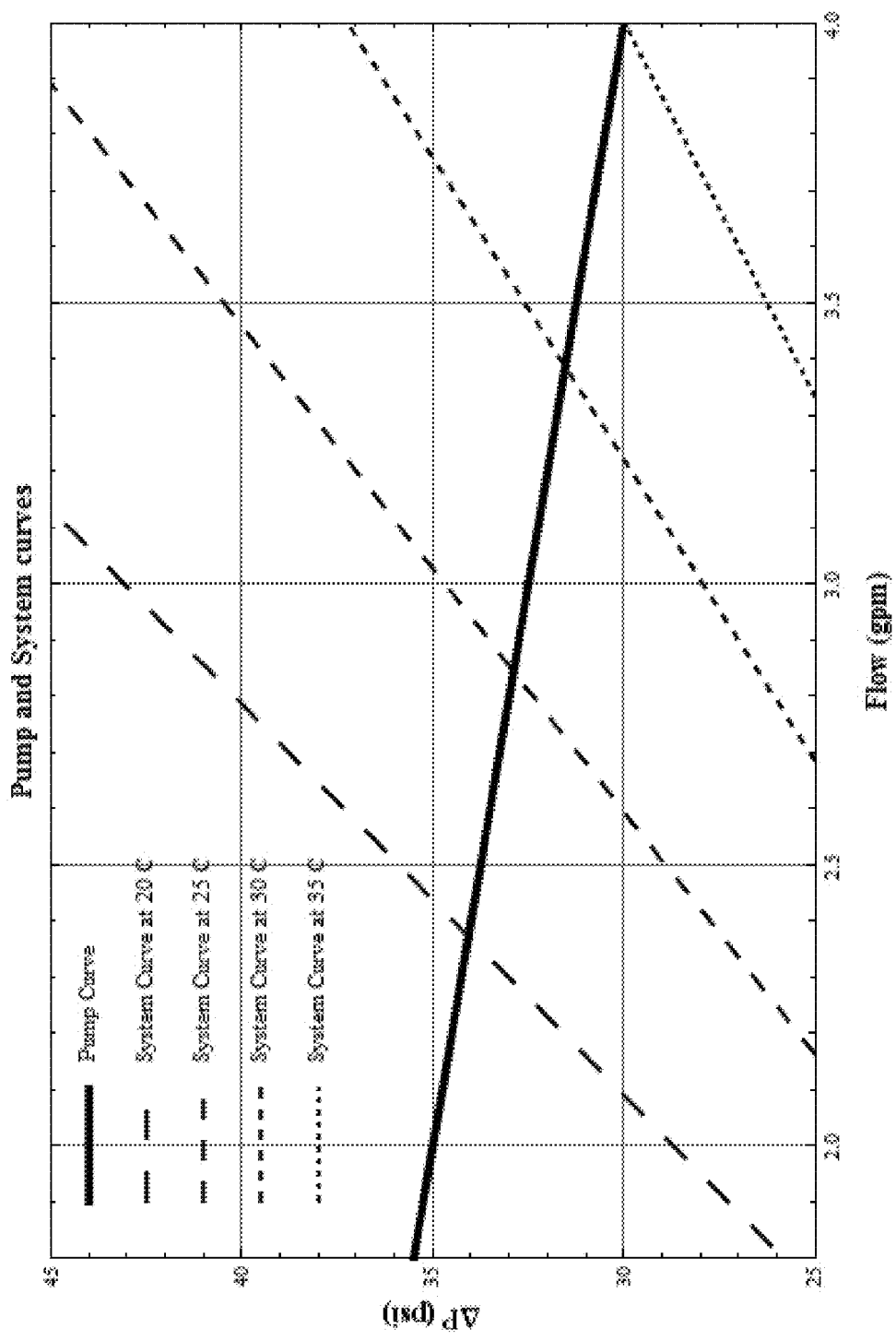
FIG. 3 is a graph of pump and system curves for the conduit system of FIG. 1.
Figure 4:
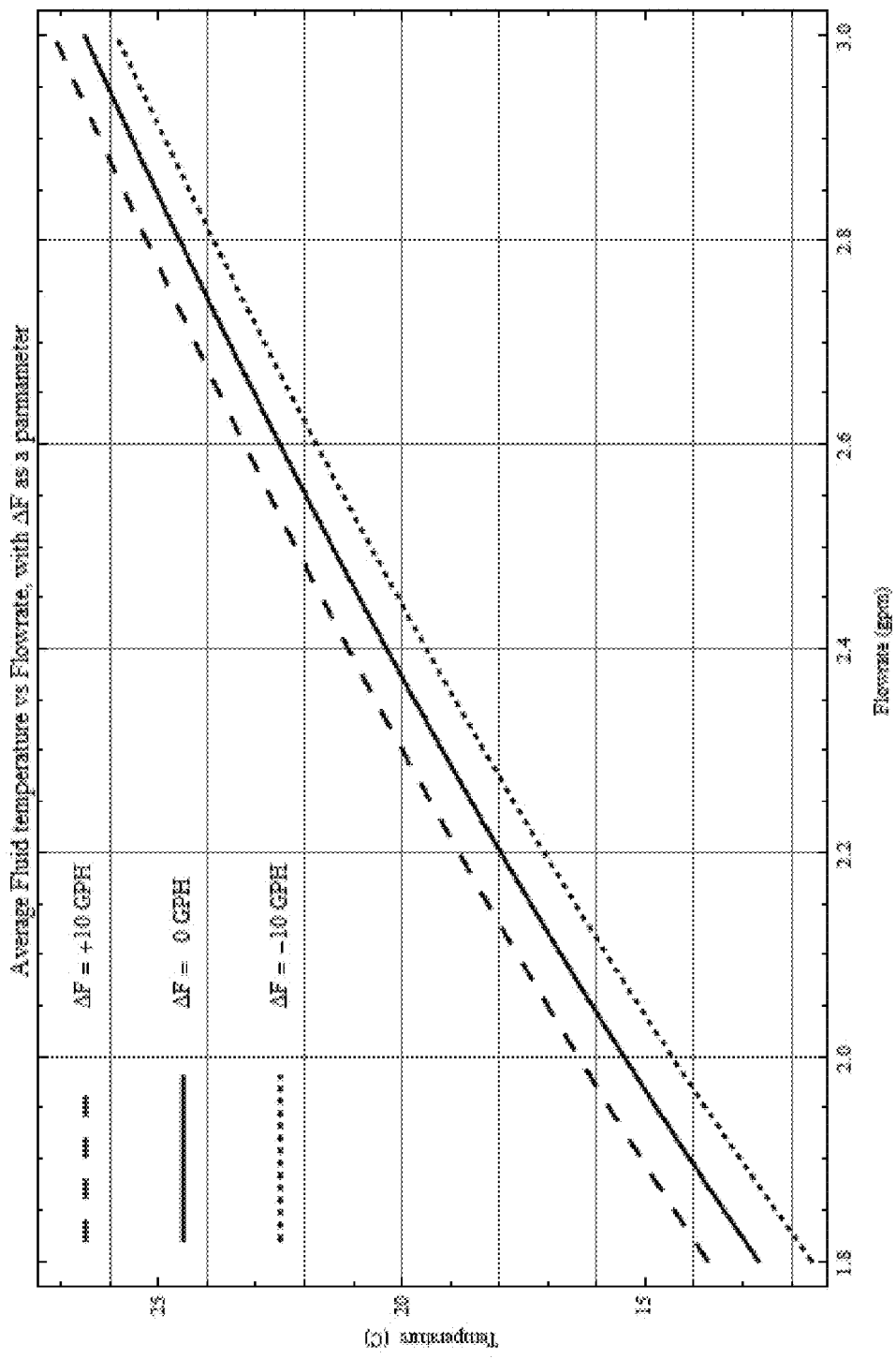
FIG. 4 is a graph of a function, derived from the graph of the pump and system curves of FIG. 3, that relates fluid flowrate to average fluid temperature.

In one example, pump and system curves of the particular fluid and the particular system are used to generate a relationship between the average fluid temperature ($T_{f,avg}$) and the volumetric flowrate of the fluid. An exemplary graph of pump and system curves is illustrated in FIG. 3 (this graph relates to Examples A and B, which are discussed below). The data used to generate the pump and system curves is determined empirically. At any instantaneous time, the volumetric flowrate through the fluid conducting conduit 12 is determined by the intersection of the pump and system curves. As shown in FIG. 3, these curves may be plotted on a graph of head (or pressure difference) on the y-axis vs. flowrate on the x-axis. The pump curve describes the pressure rise generated in the pump 14 for a given volumetric flowrate. Pump curves typically have a negative slope, as the amount of pressure rise across the pump 14 decreases with volumetric flowrate through the pump. The system curve describes the pressure drop through the fluid conducting conduit 12 for a given flowrate. System curves have a positive slope, as the amount of pressure drop in the fluid conducting conduit 12 increases with volumetric flowrate. Using the pump and system curves, a function (f(x)) relating the volumetric flowrate to the average fluid temperature ($T_{f,avg}$) can be generated. A graph of an exemplary function (f(x)), using the exemplary pump and system curves in FIG. 3, is provided in FIG. 4 (this graph relates to Examples A and B, which are discussed below). The function (f(x)) is used at sub-step 30a to generate a time series of average fluid temperatures (i.e., $\{t_1, T_{f1}\}, \{t_2, T_{f2}\}, \{t_3, T_{f3}\} \ldots \{t_n, T_{fn}\}$).

As set forth above, at the second sub-step 30b, the leak detection system 13 calculates the time derivative of the average temperature ($dT_{f,avg}/dt$) at any instantaneous time (t) based on the series of average fluid temperatures ($T_{f,avg}$) calculated at sub-step 30a. Calculation of the time derivative of the average temperature ($dT_{f,avg}/dt$) at any instantaneous time (t) is based on digital signal processing of the series of average fluid temperatures ($T_{f,avg}$). In one non-limiting example, the digital signal processing utilized by the leak detection system 13 includes at least one of a smoothing filter and a low-noise differentiator filter, a Savitzky-Golay filter (also called a low-noise Lanczos differentiator), a smooth noise-robust differentiator, or similar technique. One suitable low-noise differentiator filter for use at sub-step 30b is shown in equation (7), below, which was developed by Pavel Holoborodko (www.holoborodko.com).

$$f'(x^*) \approx \frac{1}{h}\sum_{k=1}^{M} c_k(f_k - f_{-k}), \text{ where} \quad (7)$$

$$c_k = \frac{1}{2^{2m+1}}\left[\binom{2m}{m-k+1} - \binom{2m}{m-k-1}\right],$$

$$m = \frac{N-3}{2}, N = \frac{N-1}{2}$$

To estimate the derivative at any instantaneous time, equation (7) takes weighted values from N/2 data points to the left and N/2 data points to the right. In this equation, f(x*) is the derivative, ck is the weighting factor, and fk is the function value.

As set forth above, the leak detection system 13, at subprocess step 30c, uses the time derivative of the average temperature ($dT_{f,avg}/dt$), calculated at sub-process step 30b, to calculate the predicted flowrate difference ($\Delta F_{pred}$). In one example, the leak detection system 13 uses equation (6), above, which is derived from the continuity equation. The only variable in equation (6) is the time derivative of the average temperature, which is calculated at process step 30b. Thus, by calculating the time derivative of the average temperature ($dT_{f,avg}/dt$) based on the flowrates measured by the input and output flowrate sensors F1, F2, the difference in flowrate between the inlet 18 and the outlet 20 of the fluid conducting conduit 12 can be predicted. As set forth above, this predicted flowrate difference ($\Delta F_{pred}$) is compared to the measured flowrate difference ($\Delta F_{meas}$) to determine whether a leak is present in the fluid conducting conduit 12. In another example, the leak detection system 13 uses equation (5), above, to calculate the predicted flowrate difference ($\Delta F_{pred}$) using the calculated time derivative of the average temperature ($dT_{f,avg}/dt$) based on the input and output flowrate sensors F1, F2 to calculate the first term in equation (5), and the energy balance or heat transfer models, as described in U.S. Pat. No. 7,418,354, to calculate the second term in equation (5).

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, and the like.

Program code means comprising one or more program modules may be stored on the hard disk, magnetic disk, optical disk, ROM, and/or RAM, including an operating system, one or more application programs, other program modules, and program data. A user may enter commands and information into the computer through keyboard, pointing device, or other input devices, such as a microphone, joy stick, game pad, satellite dish, scanner, or the like. These and other input devices are often connected to the processing unit through a serial port interface coupled to system bus. Alternatively, the input devices may be connected by other interfaces, such as a parallel port, a game port, or a universal serial bus (USB). A monitor or another display device is also connected to system bus via an interface, such as video adapter. In addition to the monitor, personal computers typically include other peripheral output devices (not shown), such as speakers and printers.

The computer may operate in a networked environment using logical connections to one or more remote computers, such as remote computers. Remote computers may each be another personal computer, a server, a router, a network PC, a peer device or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

In operation, a method embodying aspects of the invention detects a leak in fluid conducting conduit 12. The method comprises measuring an inlet flowrate of fluid flowing in the fluid conducting conduit using flowrate sensor F1, and measuring an outlet flowrate of fluid flowing in the fluid conducting conduit using flowrate sensor F2. Flowrate sensor F1 is adjacent the inlet of the conduit 12 and flowrate sensor F2 is adjacent the outlet of the conduit 12. The processor of leak detection system 13 calculates a time derivative of average temperature of the fluid flowing in the fluid conducting conduit 12 based on the measured inlet flowrate and the measured outlet flowrate and calculates a predicted difference in flowrate between a flowrate of fluid in the conduit 12 adjacent the inlet and a flowrate of fluid in the conduit 12 adjacent the outlet based on the calculated time derivative of the average temperature. In addition, the processor compares the predicted difference in flowrate to a difference between the measured inlet flowrate and the measured outlet flowrate and, as a function of the comparison, determines whether a leak exists in the fluid conducting conduit 12.

Having described embodiments of the invention in detail, it will be apparent that modifications and variations are possible without departing from the scope of the invention defined in the appended claims.

EXAMPLES

The following non-limiting examples are provided to further illustrate embodiments of the present invention.

Example A

In this example, a model of a leak detection system was developed, according to the principles disclosed above herein, for a feeder network for underground transmission line conductors (similar to the feeder network illustrated in FIG. 1). Estimates of the pump and system curves for the feeder network were generated using typical data for such systems. The pump and system curves for the feeder network are provided in FIG. 3. In this example, it is assumed that pump curve is independent of temperature of the fluid. Using the pump and system curves provided in FIG. 3, the function (f(x)) relating the average fluid temperature (Celsius) to the flowrate of the fluid (gpm) was generated. A graph of this function (f(x)) is provided in FIG. 4.

Figure 5:
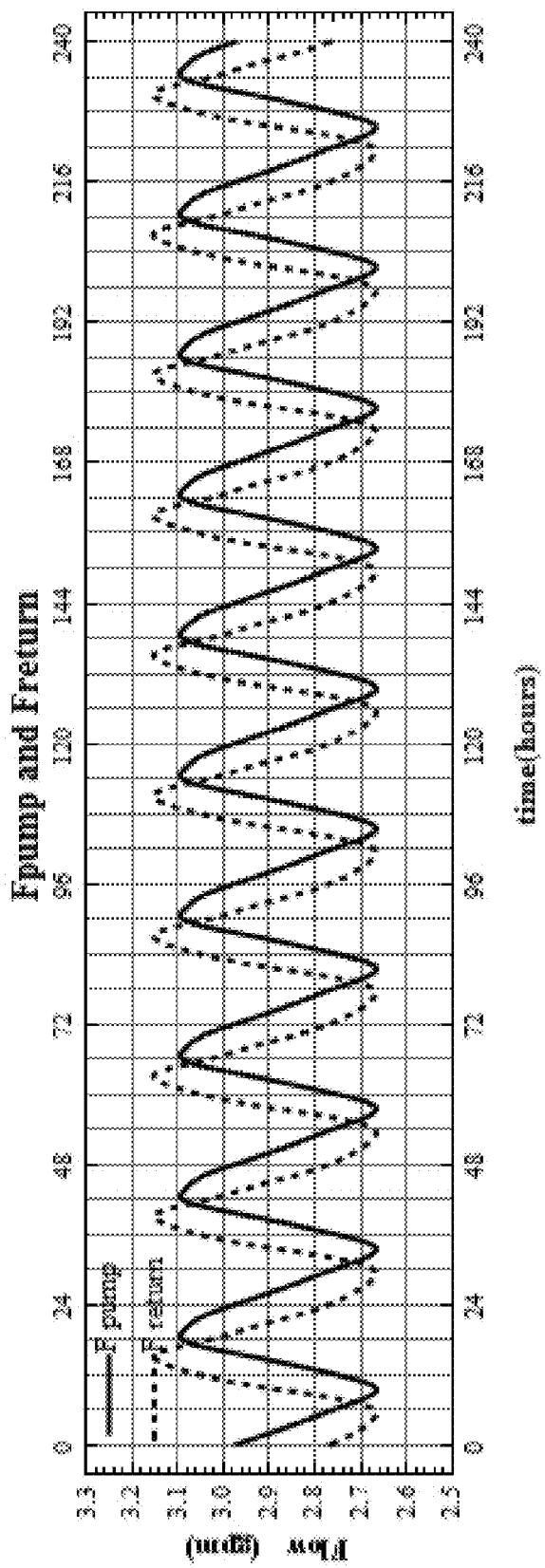
FIG. 5 is a graph the simulated inlet and outlet fluid flowrates for the conduit system of FIG. 1.

With the function (f(x)) determined for the feeder network, the measured inlet and outlet flowrates from the volumetric flowrate sensors F1, F2 were inputted into the function (f(x)). FIG. 5 is a graph showing the measured inlet and outlet flowrates taken during normal slow circulation operation of the feeder network. As can be seen from the graph, because the fluid in the fluid conducting conduit is experiencing a continuous heating and cooling cycle, the flowrate at the inlet and outlet is constantly rising and falling—rising as the fluid is being heated, falling as the fluid is being cooled. There is an offset in the peaks of the measured inlet flowrate and the measured outlet flowrate. The maximum of the inlet flowrate curve occurs when the fluid is at a maximum temperature (for that day). The maximum of the outlet flowrate curve occurs when the inlet flowrate plus the difference between the inlet and outlet flowrate is a maximum. While the inlet flowrate continues to rise while the fluid is being heated, the difference between the inlet and outlet flowrate ($\Delta F$) is at a maximum when the rate of fluid heating is at a maximum. This is why these two curves—inlet flowrate and outlet flowrate—are offset: their maximum and minimum occur at different times.

Figure 6:
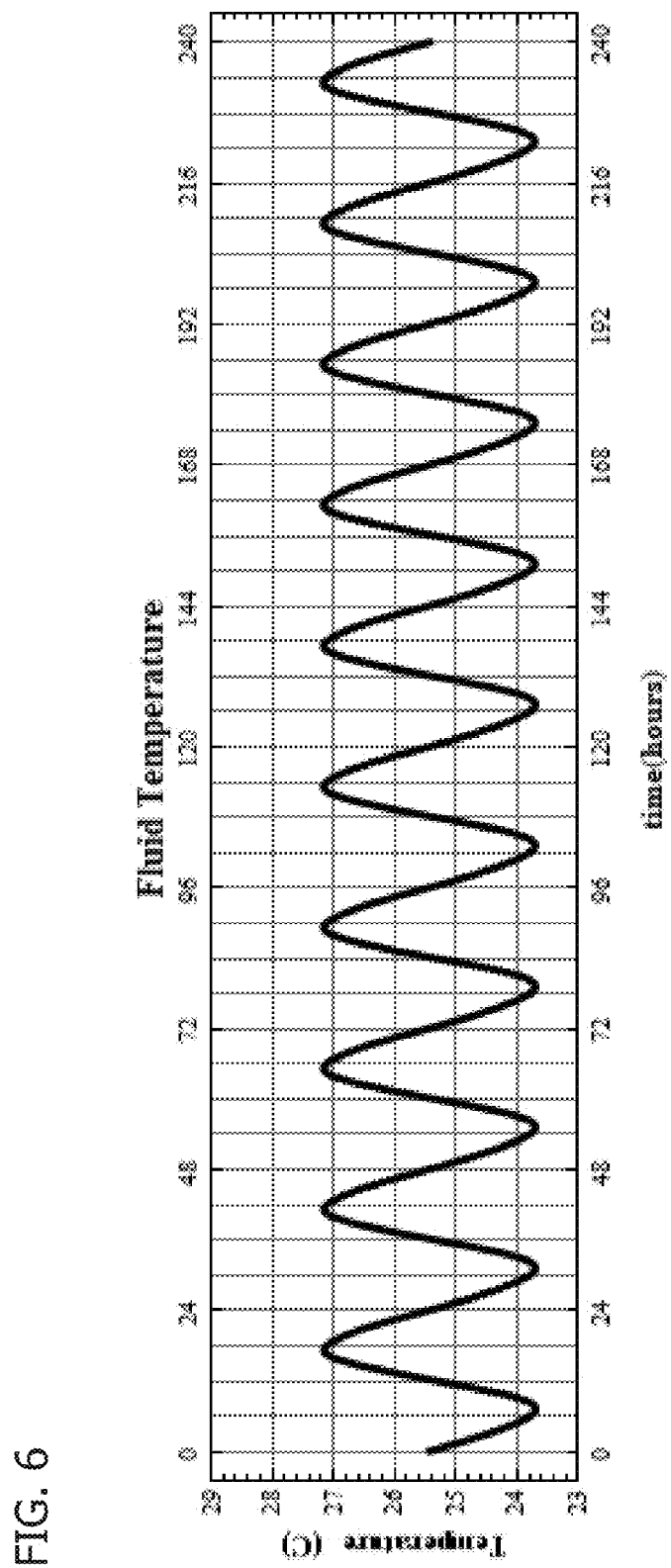
FIG. 6 is a graph of the calculated average fluid temperature based on the simulated inlet and outlet fluid flowrates for the conduit system of FIG. 1.

The inlet and outlet flowrates from the volumetric flowrate sensors F1, F2 are inputted into the function (f(x)) to generate a time series of average fluid temperatures (i.e., $\{t_1, T_{f1}\}$, $\{t_2, T_{f2}\}$, $\{t_3, T_{f3}\}$ ... $\{t_n, T_{fn}\}$). A graph showing the calculated average fluid temperatures ($T_{f,avg}$) per unit time (t), based on the measured inlet and outlet flowrates and the function (f(x)) is illustrated in FIG. 6.

Figure 7:
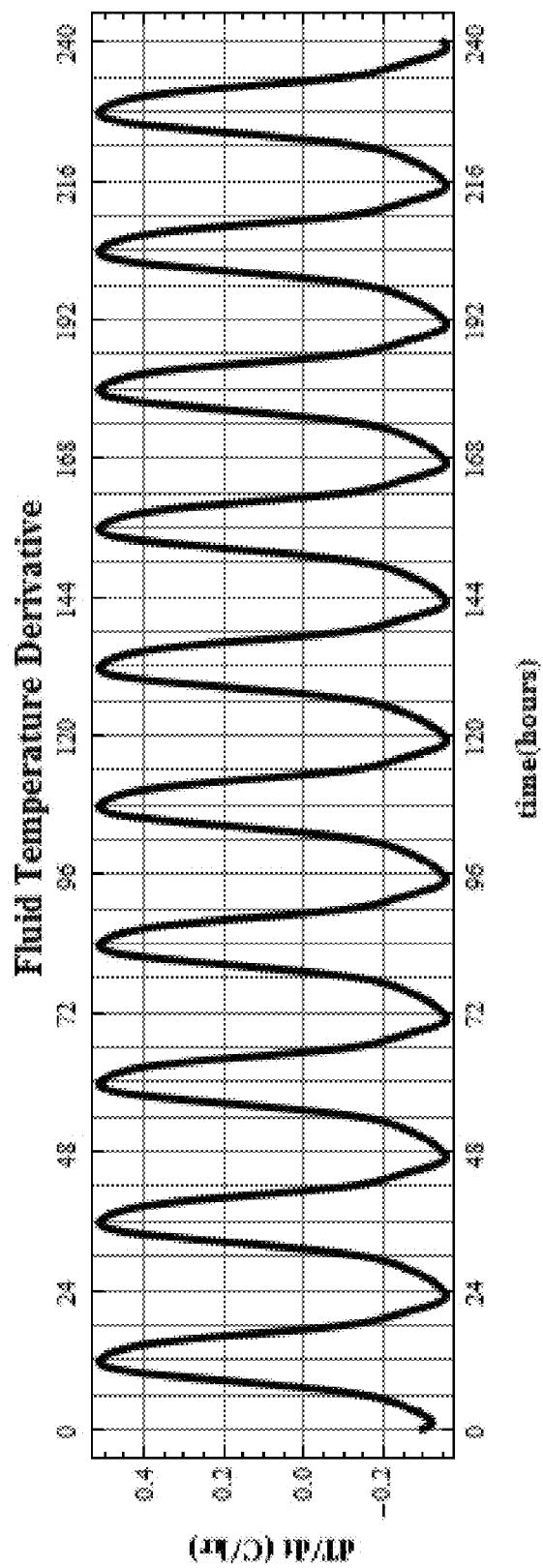
FIG. 7 is a graph of calculated time derivative of average fluid temperature per unit time based on the calculated average fluid temperature for the conduit system of FIG. 1.

Next, the time derivative of the average fluid temperature ($dT_{f,avg}/dt$) was calculated using the generated time series of average fluid temperatures (i.e., $\{t_1, T_{f1}\}$, $\{t_2, T_{f2}\}$, $\{t_3, T_{f3}\}$ ... $\{t_n, T_{fn}\}$). In the present example, Holoborodko's low-noise differentiator algorithm (disclosed above) was used. The time series of average fluid temperatures (i.e., $\{t_1, T_{f1}\}$, $\{t_2, T_{f2}\}$, $\{t_3, T_{f3}\}$ ... $\{t_n, T_{fn}\}$) was sampled, so that only 1 data point every 5 minutes was used. Holoborodko's low-noise differentiator algorithm was used with N=61, meaning that the derivative at each point was estimated using 30 data points from either side. A graph showing the calculated fluid temperature derivative per time over a period of about 10 days is illustrated in FIG. 7.

Figure 8:
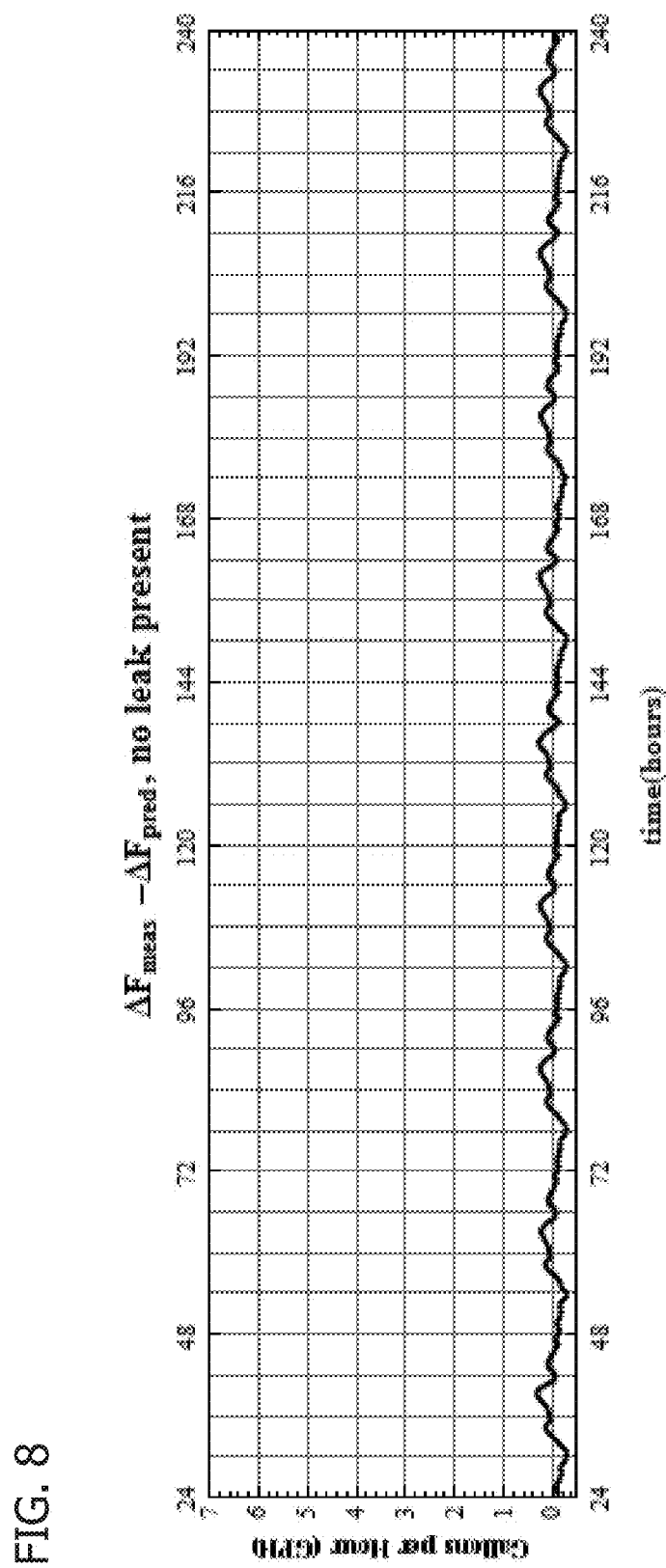
FIG. 8 is a graph of the difference of a difference between measured fluid inlet and outlet flowrates and a difference between calculated fluid inlet and outlet flowrates, as set forth in Example A, for the conduit system of FIG. 1 when no leaks are present in the conduit system.

Using the calculated time derivative of the average fluid temperature ($dT_{f,avg}/dt$), the predicted flowrate difference ($\Delta F_{pred}$) was calculated using equation (6), above. The measured flowrate difference ($\Delta F_{meas}$) was also calculated from flowrate data from the inlet and outlet flowrate sensors F1, F2. The difference between the measured and predicted flowrate differences, ($\Delta F_{meas} - \Delta F_{pred}$) was computed. A graph displaying the difference between measured flowrate difference ($\Delta F_{meas}$) and the predicted flowrate difference ($\Delta F_{pred}$) during a selected time period is illustrated in FIG. 8. As can be seen from the graph, the predicted flowrate difference ($\Delta F_{pred}$) closely follows the measured flowrate difference ($\Delta F_{meas}$) when no leak is present in the fluid conducting conduit.

Figure 9:
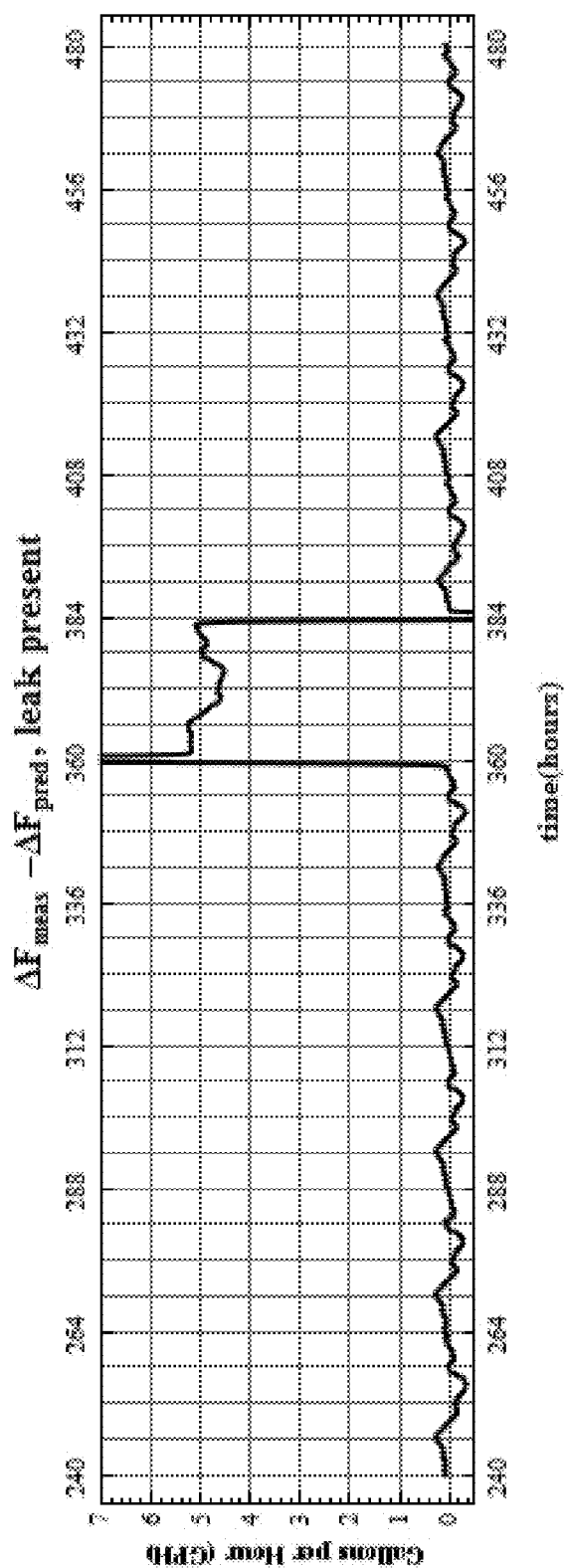
FIG. 9 is a graph of the difference of a difference between measured fluid inlet and outlet flowrates and a difference between calculated fluid inlet and outlet flowrates, as set forth in Example A, for the conduit system of FIG. 1 when a simulated leak is present in the conduit system for a selected period of time.

To illustrate the effectiveness in determining when a leak is present in the fluid conducting conduit using this embodiment of the leak detection system, a simulated (i.e., computer-generated) leak in the fluid conducting conduit was generated. Referring to FIG. 9, the simulated leak of 5 gallons per hour occurred from time 360 hours to time 384 hours. As can be seen from the graph in FIG. 9, beginning at about time 360 hours and ending at about time 384 hours, there is a large value for the difference between the measured flowrate difference ($\Delta F_{meas}$) and the predicted flowrate difference ($\Delta F_{pred}$). The value when the simulated leak was present is much larger than at other times in FIG. 9. and larger than at any time in the graph in FIG. 8.

Example B

Figure 10:
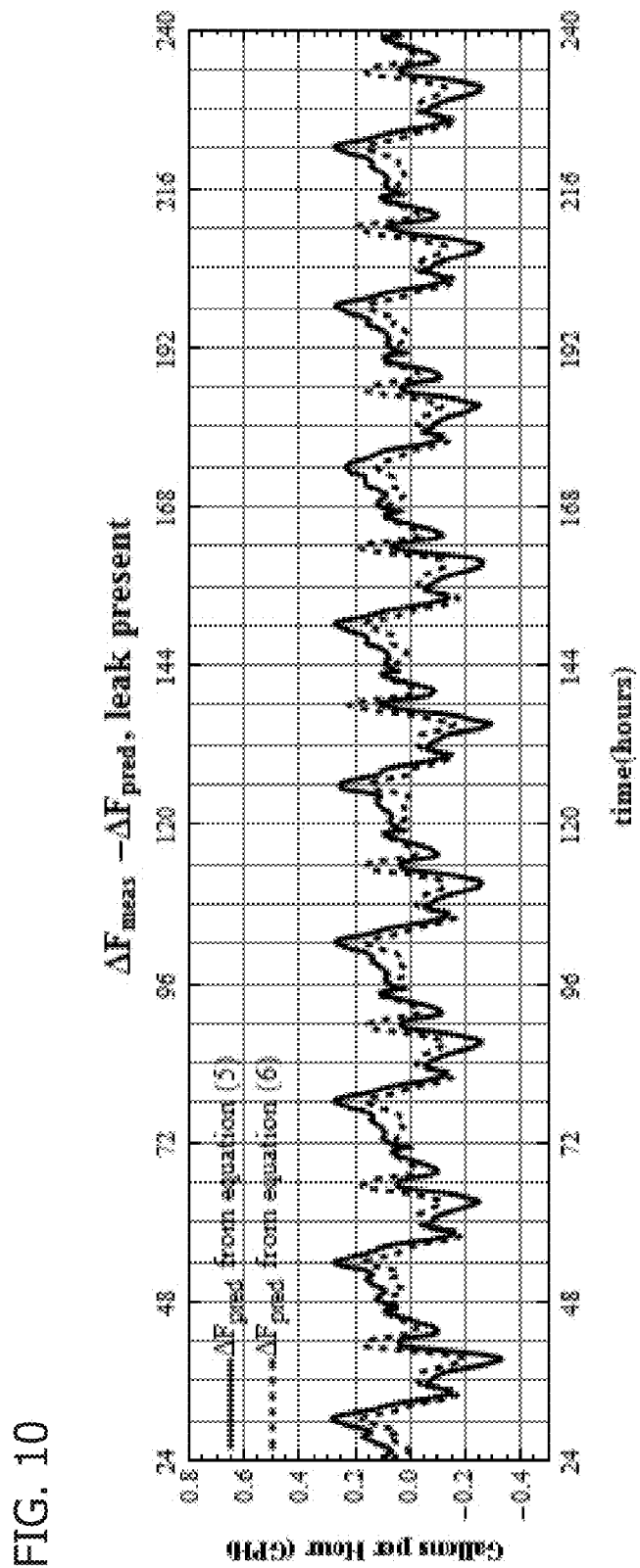
FIG. 10 is a graph comparing a first calculated fluid leak flowrate, as set forth in Example A, with a second calculated leak flowrate, as set forth in Example B, when no leaks are present in the conduit system of FIG. 1.
Figure 11:
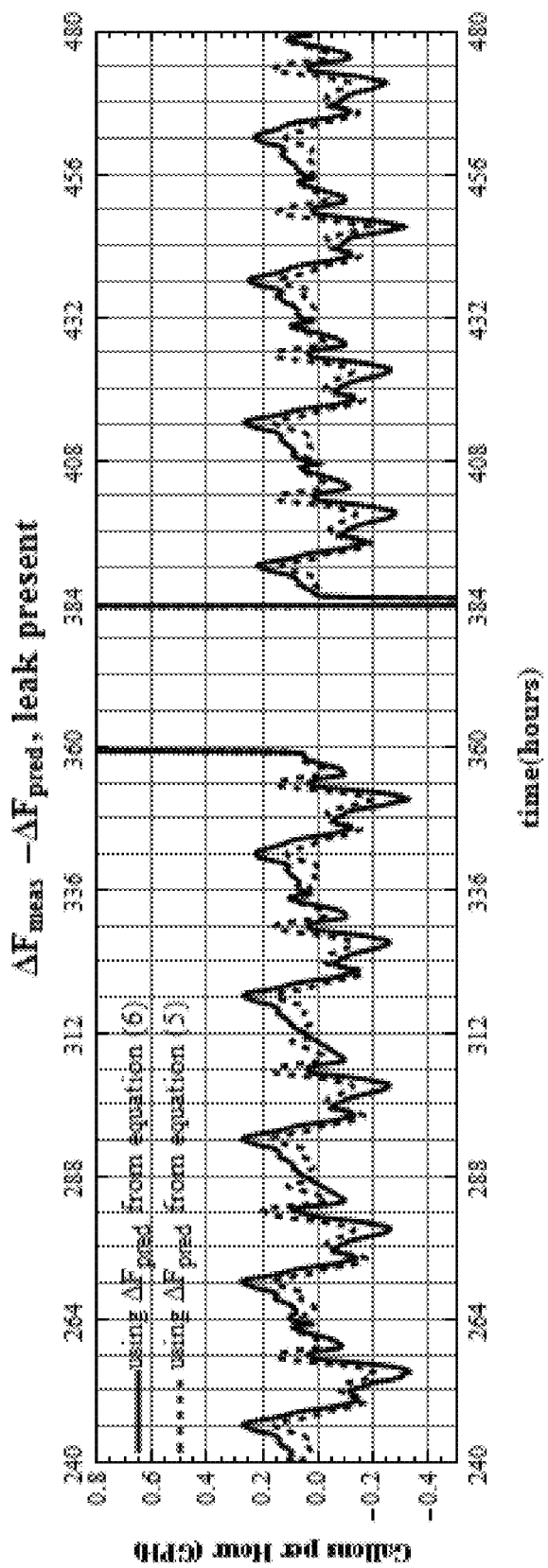
FIG. 11 is a graph comparing a first calculated fluid flowrate, as set forth in Example A, with a second calculated fluid flowrate, as set forth in Example B, when a simulated leak is present in the conduit system of FIG. 1 for a selected period of time.

As explained above, the predicted flowrate difference ($\Delta F_{pred}$) may be calculated using equation (5), as opposed to equation (6), as set forth in Example A. Accordingly, in this Example B, the predicted flowrate difference ($\Delta F_{pred}$) was calculated using equation (5). The steps performed for this Example were identical to the steps performed for Example A, except for the additional steps of calculating the second term in equation (5), and inputting the second term, along with the first term (which was calculated as set forth in Example A) to calculate the predicted flowrate difference ($\Delta F_{pred}$). To illustrate the dominance of the first term (i.e., the term calculated in Example A) in calculating the predicted flowrate difference ($\Delta F_{pred}$), the results generated by the two methods of calculating the predicted flowrate difference ($\Delta F_{pred}$) are graphed in FIGS. 10 and 11. As can be seen from the graphs in FIGS. 10 and 11, in each graph the line representing the predicted flowrate difference ($\Delta F_{pred}$) derived from equation (5) closely follows the line representing the predicted flowrate difference ($\Delta F_{pred}$) derived from equation (6). Accordingly, although in at least one embodiment the predicted flowrate difference ($\Delta F_{pred}$) may be calculated using equation (5), above, the graphs illustrated in FIGS. 10 and 11 show that it may only be necessary to calculate the predicted flowrate difference ($\Delta F_{pred}$) using equation (6) in order to detect whether there is a leak in the fluid conducting conduit.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for detecting a leak in a fluid conducting conduit, the method comprising:
   measuring an inlet flowrate of fluid flowing in the fluid conducting conduit using a first flowrate sensor, said first flowrate sensor being positioned adjacent an inlet of the fluid conducting conduit;
   measuring an outlet flowrate of fluid flowing in the fluid conducting conduit using a second flowrate sensor, said second flowrate sensor being positioned adjacent an outlet of the fluid conducting conduit;
   generating a time series of expected average temperature of the fluid flowing in the fluid conducting conduit based on the measured inlet flowrate and the measured outlet flowrate;
   calculating a time derivative of average temperature of the fluid flowing in the fluid conducting conduit based on the measured inlet flowrate and the measured outlet flowrate, wherein said calculating a time derivative of average temperature of the fluid comprises analyzing a time series of expected average temperature of the fluid and generating said calculated time derivative of average temperature of the fluid based thereon;
   calculating a predicted difference in flowrate between a flowrate of fluid in the fluid conducting conduit adjacent the inlet and a flowrate of fluid in the fluid conducting conduit adjacent the outlet based on the calculated time derivative of the average temperature of the fluid flowing in the fluid conducting conduit;
   comparing the predicted difference in flowrate to a difference between the measured inlet flowrate and the measured outlet flowrate; and
   determining whether a leak exists in the fluid conducting conduit based on the comparing.

2. The method set forth in claim 1, wherein said calculating a time series of expected average temperature comprises inputting the measured inlet flowrate and the measured outlet flowrate to a function that directly relates flowrate of fluid in the fluid conducting conduit to the temperature of the fluid.

3. The method set forth in claim 2, further comprising generating said function that directly relates flowrate of fluid in the fluid conducting conduit to the temperature of the fluid using pump and system curves for the fluid conducting conduit.

4. The method set forth in claim 1, wherein said analyzing the time series of expected average temperature of the fluid to generate said calculated time derivative of average temperature of the fluid comprises inputting the time series of expected average temperature of the fluid into a digital signal filter.

5. The method set forth in claim 4, wherein the digital signal filter comprises at least one of a smoothing filter and a low-noise differentiator filter.

6. The method set forth in claim 1, wherein said calculating a predicted difference in flowrate comprises inputting said calculated time derivative of average temperature into one of the following functions:

$$\overline{\rho}(F_{x=L} - F_{x=0}) = -AL\frac{\overline{d\rho}}{dT}\frac{\overline{dT}}{dt}, \text{ and}$$

$$\overline{\rho}(F_{x=L} - F_{x=0}) =$$
$$-AL\frac{\overline{d\rho}}{dT}\frac{\overline{dT}}{dt} - \frac{\overline{d\rho}}{dT}(F_{(x=L)}(T_{(x=L)} - \overline{T}) - F_{(x=0)}(T_{(x=0)} - \overline{T})).$$

7. The method set forth in claim 1, wherein said comparing the measured difference in flowrate and the predicted difference in flowrate comprises determining whether the difference between said measured difference in flowrate and said predicted difference in flowrate is greater than or greater than or equal to a pre-defined threshold value.

8. A computer-implemented leak detection system for use in detecting a leak in a fluid conducting conduit, the leak detection system comprising:
   a first flowrate sensor positioned adjacent an inlet of the fluid conducting conduit for measuring an inlet flowrate of fluid;
   a second flowrate sensor positioned adjacent an outlet of the fluid conducting conduit for measuring an outlet flowrate of fluid; and
   a processor and a memory, the processor configured to:
      receive data, from the respective first and second flowrate sensors, relating to the measured inlet flowrate of fluid and the measured outlet flowrate of fluid;
      generate a time series of expected average temperature of the fluid flowing in the fluid conducting conduit based on the measured inlet flowrate and the measured outlet flowrate;
      calculate a time derivative of average temperature of fluid based on the measured inlet flowrate and the measured outlet flowrate by analyzing the time series of expected average temperature of the fluid;
      calculate a predicted difference in flowrate between a flowrate of fluid in the fluid conducting conduit adjacent the inlet and a flowrate of fluid in the fluid conducting conduit adjacent the outlet based on the calculated time derivative of the average temperature of the fluid flowing in the fluid conducting conduit;
      determine whether a leak exists in the fluid conducting conduit based on a comparison between the predicted difference in flowrate and a difference between the measured inlet flowrate and the measured outlet flowrate.

9. The computer-implemented leak detection system set forth in claim 8, wherein the processor is configured to:
   input the measured inlet flowrate and the measured outlet flowrate into a function that directly relates flowrate of fluid in the fluid conducting conduit to the temperature of the fluid to calculate the time series of expected average temperature of the fluid.

10. The computer-implemented leak detection system set forth in claim 8, wherein the processor is configured to:
   input the time series of expected average temperature of the fluid into a digital signal filter for use in generating said calculated time derivative of average temperature of the fluid.

11. The computer-implemented leak detection system set forth in claim 10, wherein the digital signal filter comprises at least one of a smoothing filter and a low-noise differentiator filter.

12. The computer-implemented leak detection system set forth in claim 8, wherein the processor is configured to:
   input said calculated time derivative of average temperature into one of the following functions to calculate the predicted difference in flowrate:

$$\overline{\rho}(F_{x=L} - F_{x=0}) = -AL\frac{\overline{d\rho}}{dT}\frac{\overline{dT}}{dt}, \text{ and}$$

$$\overline{\rho}(F_{x=L} - F_{x=0}) =$$
$$-AL\frac{\overline{d\rho}}{dT}\frac{\overline{dT}}{dt} - \frac{\overline{d\rho}}{dT}(F_{(x=L)}(T_{(x=L)} - \overline{T}) - F_{(x=0)}(T_{(x=0)} - \overline{T})).$$

13. The computer-implemented leak detection system set forth in claim 8, wherein the processor is configured to:
   determine whether the difference between said measured difference in flowrate and said predicted difference in flowrate is greater than or greater than or equal to a pre-defined threshold value.

14. A non-transitory, computer-readable medium containing computer-readable instructions for use in detecting a leak in a fluid conducting conduit, wherein the computer-readable instructions are executable by a processor for performing the steps of:
   receiving data, from a first flowrate sensor, relating to a measured inlet flowrate of fluid in the fluid conducting conduit;
   receiving data, from a second flowrate sensor, relating to a measured outlet flowrate of fluid in the fluid conducting conduit;
   generating a time series of expected average temperature of the fluid flowing in the fluid conducting conduit based on the measured inlet flowrate and the measured outlet flowrate; and
   calculating a time derivative of average temperature of fluid based on the measured inlet flowrate and the measured outlet flowrate by analyzing the time series of expected average temperature of the fluid;
   calculating a predicted difference in flowrate between a flowrate of fluid in the fluid conducting conduit adjacent the inlet and a flowrate of fluid in the fluid conducting conduit adjacent the outlet based on the calculated time derivative of the average temperature of the fluid flowing in the fluid conducting conduit;
   determining whether a leak exists in the fluid conducting conduit based on a comparison between the predicted difference in flowrate and a difference between the measured inlet flowrate and the measured outlet flowrate.

15. The non-transitory, computer-readable medium set forth in claim 14, wherein the computer-readable instructions are executable by the processor for performing the step of:
   inputting the measured inlet flowrate and the measured outlet flowrate into a function that directly relates flowrate of fluid in the fluid conducting conduit to the temperature of the fluid to calculate the time series of expected average temperature of the fluid.

16. The non-transitory, computer-readable medium set forth in claim 14, wherein the computer-readable instructions are executable by the processor for performing the step of:
   inputting the time series of expected average temperature of the fluid into a digital signal filter for use in generating said calculated time derivative of average temperature of the fluid.

17. The non-transitory, computer-readable medium set forth in claim 16, wherein the digital signal filter comprises at least one of a smoothing filter and a low-noise differentiator filter.

18. The non-transitory, computer-readable medium set forth in claim 14, wherein the computer-readable instructions are executable by the processor for performing the step of:
   inputting said calculated time derivative of average temperature into one of the following functions to calculate the predicted difference in flowrate:

$$\overline{\rho}(F_{x=L} - F_{x=0}) = -AL\frac{\overline{d\rho}}{dT}\frac{\overline{dT}}{dt}, \text{ and}$$

$$\overline{\rho}(F_{x=L} - F_{x=0}) = -AL\frac{\overline{d\rho}}{dT}\frac{\overline{dT}}{dt} - \frac{\overline{d\rho}}{dT}(F_{(x=L)}(T_{(x=L)} - \overline{T}) - F_{(x=0)}(T_{(x=0)} - \overline{T})).$$

19. The non-transitory, computer-readable medium set forth in claim 14, wherein the computer-readable instructions are executable by the processor for performing the step of:
   determining whether the difference between said measured difference in flowrate and said predicted difference in flowrate is greater than or greater than or equal to a pre-defined threshold value.

* * * * *